United States Patent
Kurosaka et al.

(10) Patent No.: US 7,108,377 B2
(45) Date of Patent: Sep. 19, 2006

(54) VIDEO LIGHT PRODUCING DEVICE AND PROJECTION TYPE VIDEO DISPLAY

(75) Inventors: Yoshitaka Kurosaka, Osaka (JP); Takashi Ikeda, Osaka (JP); Hideyuki Kanayama, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 165 days.

(21) Appl. No.: 10/784,924

(22) Filed: Feb. 24, 2004

(65) Prior Publication Data
US 2004/0227899 A1    Nov. 18, 2004

(30) Foreign Application Priority Data
Feb. 25, 2003  (JP) ............................ 2003-046742
Sep. 30, 2003  (JP) ............................ 2003-339272

(51) Int. Cl.
*G03B 21/26*  (2006.01)
*G03B 21/28*  (2006.01)
*G02F 1/1335*  (2006.01)
*G02F 1/00*  (2006.01)
*G02B 27/14*  (2006.01)
*G02B 6/00*  (2006.01)
*H04N 5/74*  (2006.01)

(52) U.S. Cl. ........................ 353/33; 353/34; 353/81; 353/82; 353/102; 349/7; 349/8; 348/750; 348/757; 348/758; 362/551; 385/133

(58) Field of Classification Search ............... 353/31, 353/20, 30, 33, 34, 37, 81, 82, 98, 99, 102; 362/551, 555, 800; 385/133, 901; 359/34, 359/618, 629, 633, 634, 636, 638; 349/5, 349/7, 8; 348/744, 750, 757, 758
See application file for complete search history.

(56) References Cited

U.S. PATENT DOCUMENTS
4,747,030 A  *  5/1988  Offner et al. ............... 362/302
(Continued)

FOREIGN PATENT DOCUMENTS
JP  2002-162520  6/2002

OTHER PUBLICATIONS
Y. Kurosaka et al.; "Development of Ultra-Compact Color Separation and Recombination System Comprized of Only One Cubical Space"; IDW; c. 2002; pp. 469-472.

*Primary Examiner*—W. B. Perkey
*Assistant Examiner*—Rochelle Blackman
(74) *Attorney, Agent, or Firm*—McDermott Will & Emery LLP

(57) ABSTRACT

To provide a projection type video display capable of reliably preventing a double image from being produced. A first light flux producer for producing a first light flux and a second light flux producer for producing a second light flux are arranged on the light emission side of a lamp. The light flux producer comprises a condenser lens, a rod integrator, and a pair of lenses. Lights passing through the pair of lenses are respectively refracted by condenser lenses, and are respectively introduced into first and second areas of a liquid crystal display panel in such a manner as to cross an optical surface in a color separating and mixing sector.

12 Claims, 8 Drawing Sheets

U.S. PATENT DOCUMENTS

| | | | |
|---|---|---|---|
| 5,649,753 A * | 7/1997 | Masumoto | 353/102 |
| 5,857,041 A * | 1/1999 | Riser et al. | 385/31 |
| 5,868,481 A * | 2/1999 | Conner et al. | 353/38 |
| 6,318,863 B1 * | 11/2001 | Tiao et al. | 353/31 |
| 6,710,854 B1 * | 3/2004 | Shiraishi et al. | 355/67 |
| 2003/0011752 A1 * | 1/2003 | Ikeda et al. | 353/31 |
| 2003/0231262 A1 * | 12/2003 | Janssen | 349/5 |
| 2005/0162853 A1 * | 7/2005 | Jain | 362/298 |

* cited by examiner (a)

(b)

VIDEO LIGHT PRODUCING DEVICE AND PROJECTION TYPE VIDEO DISPLAY

BACKGROUND OF THE INVENTION

Field of the Invention

The present invention relates to a video light producing device comprising a color separating and mixing element in a cubic shape and a projection type video display.

FIG. 5 is a perspective view showing a liquid crystal projector using a color separating and mixing element 20 in a cubic shape. The liquid crystal projector is disclosed in Japanese Patent Application (JP-A-2002-162520) by the applicant of the present invention. The color separating and mixing element 20 comprises a light incidence surface opposed to a light source 10, three light emission/incidence surfaces respectively opposed to reflection type liquid crystal display panels 31, 32, and 33, a light emission surface opposed to a projection optical system 40, and another surface. The color separating and mixing element 20 comprises in its inner part a color separating and mixing sector 50 for separating light incident from the light source 10 into the three primary colors and emitting the color lights from the predetermined light emission/incidence surfaces. The emitted color lights are respectively reflected by the reflection type liquid crystal display panels 31, 32, and 33 arranged opposite to the light emission/incidence surfaces. Each of the reflected color lights colors is returned to the color separating and mixing element 20 after the direction of polarization thereof is rotated by 90°. The color separating and mixing sector 50 further mixes (synthesizes) the color lights in the three primary colors which have been returned to the color separating and mixing element 20. Light obtained by the mixing (color video light) is given to the projection optical system 40 from the light emission surface.

The color separating and mixing sector 50 is formed of a dielectric multilayer film (membrane), for example, and comprises three optical surfaces 51, 52, and 53, as respectively shown in FIGS. 7, 8, and 9. Red light is transmitted by the optical surface 51, reflected by the liquid crystal display panel for red color 31 and returned, and is reflected by the optical surface 51 and emitted from the light emission surface. Green light is reflected by the optical surface 51, reflected by the liquid crystal display panel for green color 32 and returned, and is transmitted by the optical surface 51 and emitted from the light emission surface. Blue light is reflected by the optical surface 52, reflected by the liquid crystal display panel for blue color 33 and returned, and is reflected by the optical surface 53 and emitted from the light emission surface.

FIG. 6 is an explanatory view showing the outline of an optical system for the above-mentioned reflection type liquid crystal projector. FIG. 6(b) simply illustrates the relationship among the light source 10, the color separating and mixing element 20, and the reflection type liquid crystal display panel 31 (a phase plate or the like is also omitted), and FIG. 6(a) illustrates the relationship between reflected light (modulated light) by the reflection type liquid crystal display panel 31 and the optical surface 53 in the color separating and mixing sector 50. An integrator lens 62 is arranged on the light emission side of a lamp 11. The integrator lens 62 comprises a pair of lens arrays 62a and 62b, and is so designed that each of convex lenses composing each of the lens arrays irradiates the whole surface of the reflection type liquid crystal display panel 31 (32, 33), to average partial luminance nonuniformity which exists in light emitted from the lamp 11 and reduce the difference in light amount between the center and the periphery of a screen. Light emitted from the integrator lens 62 is incident on the light incidence surface of the color separating and mixing element 20 through condenser lenses 63 and 64.

As shown in FIG. 6, light incident on one of the convex lenses composing the incidence-side lens array 62a is focused in the vicinity of the corresponding convex lens in the emission-side lens array 62b, is refracted toward the center by the condenser lenses 63 and 64, and is obliquely introduced into the liquid crystal display panel 31, and the light reflected by the liquid crystal display panel 31 is obliquely incident on the color separating and mixing element 20. By way of example, the optical surface 53 in the color separating and mixing sector 50 is arranged parallel to the direction of light emission/incidence of the liquid crystal display panel for red color 31, and reflects a part of modulated light reflected by the liquid crystal display panel for red color 31 and obliquely incident thereon. As shown in FIG. 6(c), light which reaches the optical surface 53 after being reflected by the liquid crystal display panel 31 is totally reflected, and is focused at a corresponding position on the screen as if light modulated at a point a on the panel was emitted from a point b on the panel. Further, as shown in FIG. 6(a), light which does not reach the optical surface 53 after being reflected by the liquid crystal display panel 31 and is modulated as it is at the point b on the panel is focused at a corresponding position on the screen. Consequently, lights from two points, i.e., the point a and the point b on the panel are superimposed and focused at a position corresponding to the point b on the screen, thereby causing a double image.

SUMMARY OF THE INVENTION

Therefore, the applicant of the present invention has devised a configuration shown in FIG. 10 as an optical system for a reflection type liquid crystal projector capable of preventing the above-mentioned double image from being produced. In such a configuration, a first integrator lens 65 and a second integrator lens 66 are arranged on the light emission side of a lamp 11. A first light flux is produced by the first integrator lens 65, and a second light flux is produced by the second integrator lens 66.

The first integrator lens 65 comprises a pair of lens arrays 65a and 65b, and each of convex lenses (irrespective of whether the convex lens is directed toward the light incidence side or the light emission side) composing each of the lens arrays irradiates a first irradiation area of a reflection type liquid crystal display panel 31. That is, in the first integrator lens 65, light incident on one of the convex lenses composing the incidence-side lens array 65a is focused in the vicinity of the corresponding convex lens in the emission-side lens array 65b, is refracted by a condenser lens 63, and is introduced into the liquid crystal display panel 31 in such a manner as to cross an optical surface 53 in a color separating and mixing sector 50.

The second integrator lens 66 comprises a pair of lens arrays 66a and 66b, and each of convex lenses (irrespective of whether the convex lens is directed toward the light incidence side or the light emission side) composing each of the lens arrays irradiates a second irradiation area of the reflection type liquid crystal display panel 31. That is, in the second integrator lens 66, light incident on one of the convex lenses composing the incidence-side lens array 66a is focused in the vicinity of the corresponding convex lens in the emission-side lens array 66b, is refracted by the condenser lens 63, and is introduced into the liquid crystal display panel 31 in such a manner as to cross the optical surface 53 in the color separating and mixing sector 50.

Light from a light source 10 is thus changed into two light fluxes by the first integrator lens 65 and the second integrator lens 66. The two light fluxes cross each other on the optical surface 53 in the color separating and mixing sector 50, to be respectively introduced into a first irradiation area and a second irradiation area of the liquid crystal display panel 31.

By such a configuration, reflected light modulated by the reflection type liquid crystal display panel 31 is reflected in a direction away from the optical surface 53 in the color separating and mixing sector 50, not to cross the optical surface 53 in the color separating and mixing sector 50. Accordingly, a double image is prevented from being formed by total reflection and transmission on the optical surface 53 in the color separating and mixing sector 50. Although transmission and total reflection occur when the two light fluxes are incident on the optical surface 53, total reflection on one surface of the optical surface before being incident on the liquid crystal display panel is canceled by total reflection on the other surface, not to lead to imbalance in brightness between the first and second irradiation areas of the liquid crystal display panel.

In the above-mentioned optical system, however, lights (secondary lights), out of lights emitted from the one convex lens in the lens array 66a, introduced into the convex lenses other than the corresponding convex lens in the lens array 66b cannot cross to the optical surface 53 in the color separating and mixing sector 50, to be introduced into the liquid crystal display panel 31 as indicated by a dotted line in FIG. 10, thereby making it impossible to reliably prevent the double image from being produced.

In view of the foregoing circumstances, an object of the present invention is to provide a video light producing device and a projection type video display capable of reliably preventing a double image from being produced.

In order to solve the above-mentioned problem, in a video light producing device comprising a color separating and mixing element, having a color separating and mixing sector having a plurality of different surfaces arranged in its transparent cube, for receiving predetermined polarized light from a light source on a first face of the cube, giving lights to reflection type light modulating elements respectively arranged opposite to second, third, and fourth faces of the cube as well as receiving their reflected modulated lights thereon, and mixing the incident reflected modulated lights and emitting light obtained by the mixing from a fifth face of the cube, a video light producing device according to the present invention is characterized in that the light from the light source is changed into two light fluxes by two rod integrators, and the two light fluxes cross each other on the predetermined optical surface of the color separating and mixing sector, to be introduced into a first irradiation area and a second irradiation area of the predetermined reflection type light modulating element.

In the above-mentioned configuration, the two light fluxes are respectively introduced into the first irradiation area and the second irradiation area of the reflection type light modulating element after crossing each other on the surface of the color separating and mixing sector. Accordingly, the reflected light modulated by the reflection type light modulating element is reflected in a direction away from an optical surface parallel to an optical axis. Consequently, the light does not cross the optical surface parallel to the optical axis, thereby preventing a double image from being formed by total reflection and transmission on the optical surface parallel to the optical axis. The two light fluxes are completely separated from each other by the two rod integrators and are given in an independent form, thereby reliably preventing the double image form being formed.

The video light producing device may be so configured that there is provided a light source comprising a reflector in the shape of a curved surface, and approximately parallel lights from the light source are condensed, and are introduced into light incidence surfaces of the two rod integrators.

The video light producing device may be so configured that there is provided a light source comprising a reflector for forming two light converging points from one light emitting point, and light incidence surfaces of the two rod integrators are respectively arranged in the vicinity of the positions of the two light converging points of the light source.

The video light producing device may be so configured that there are provided two light sources, and lights from the light sources are respectively introduced into light incidence surfaces of the two rod integrators.

Each of the light sources may be composed of a solid-state light source.

The video light producing device may be so configured that an single optical element is provided at a position on the light incidence side of the color separating and mixing element, and the two light fluxes which arrive in a crossing state is refracted by the optical element.

An optical system arranged on the light emission side in the two rod integrators may comprise at least a first optical element for condensing light emitted from each of the rod integrators and a second optical element arranged in the vicinity of light converging point of the first optical element.

The video light producing device may be so configured that the two rod integrators are arranged parallel to each other, and the optical system comprises a third optical element for refracting lights passing through the second optical element and crossing the refracted lights each other. Alternatively, the video light producing device may be so configured that the two rod integrators are arranged unparallel to each other, and lights passing through the second optical element cross each other.

Letting A:B be an aspect ratio in the reflection type light modulating element, each of the first irradiation area and the second irradiation area may be divided at a ratio of A:B/2.

In the video light producing device, the light source, the color separating and mixing element, and the optical element leading to the color separating and mixing element from the light source may be unitized.

A projection type video display according to the present invention is characterized by comprising any one of the above-mentioned video light producing devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 5:
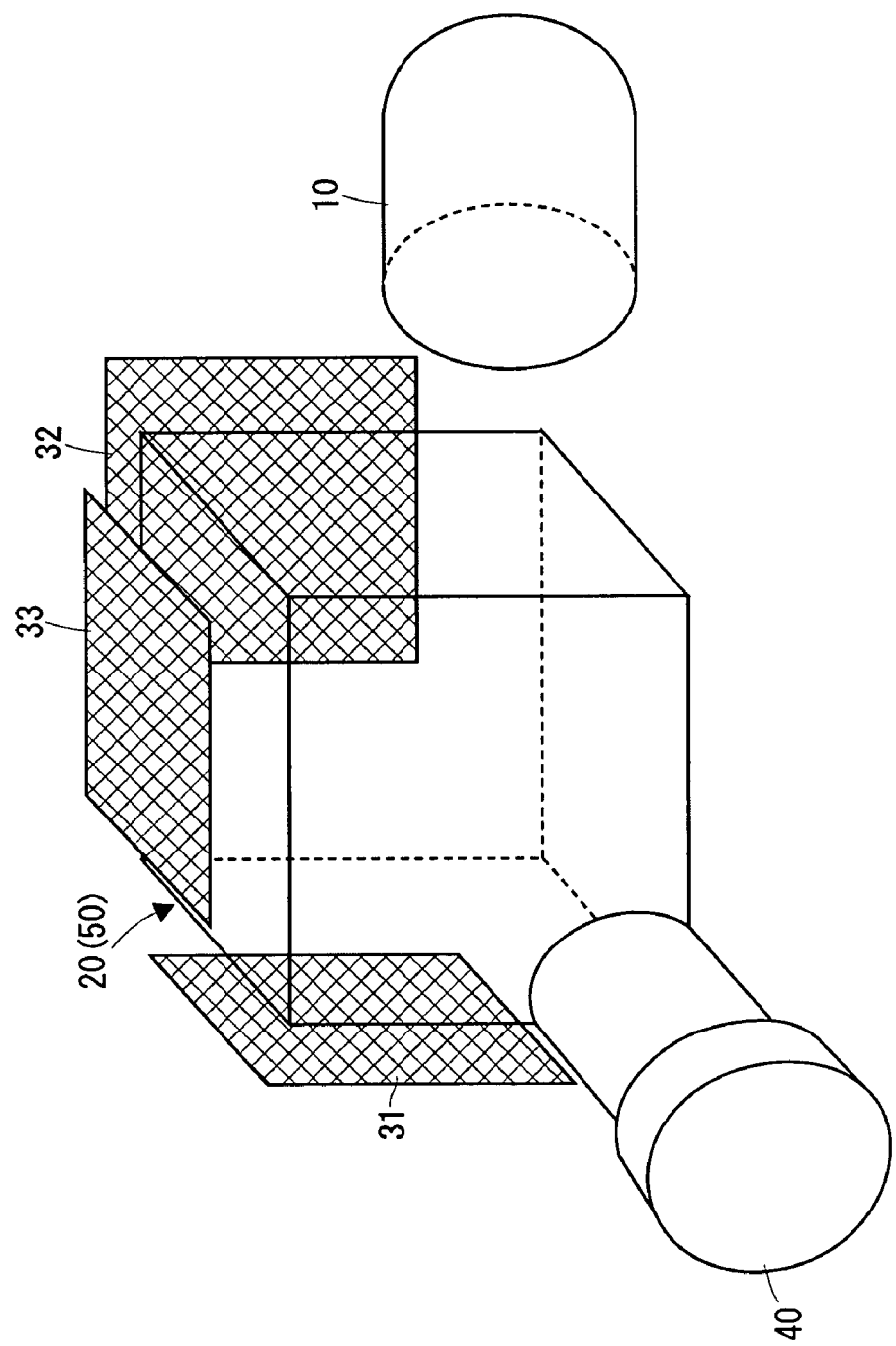
FIG. 5 is a diagram showing a background and a perspective view showing the outline of a reflection type liquid crystal projector having a color separating and mixing element in a cubic shape.
Figure 6:
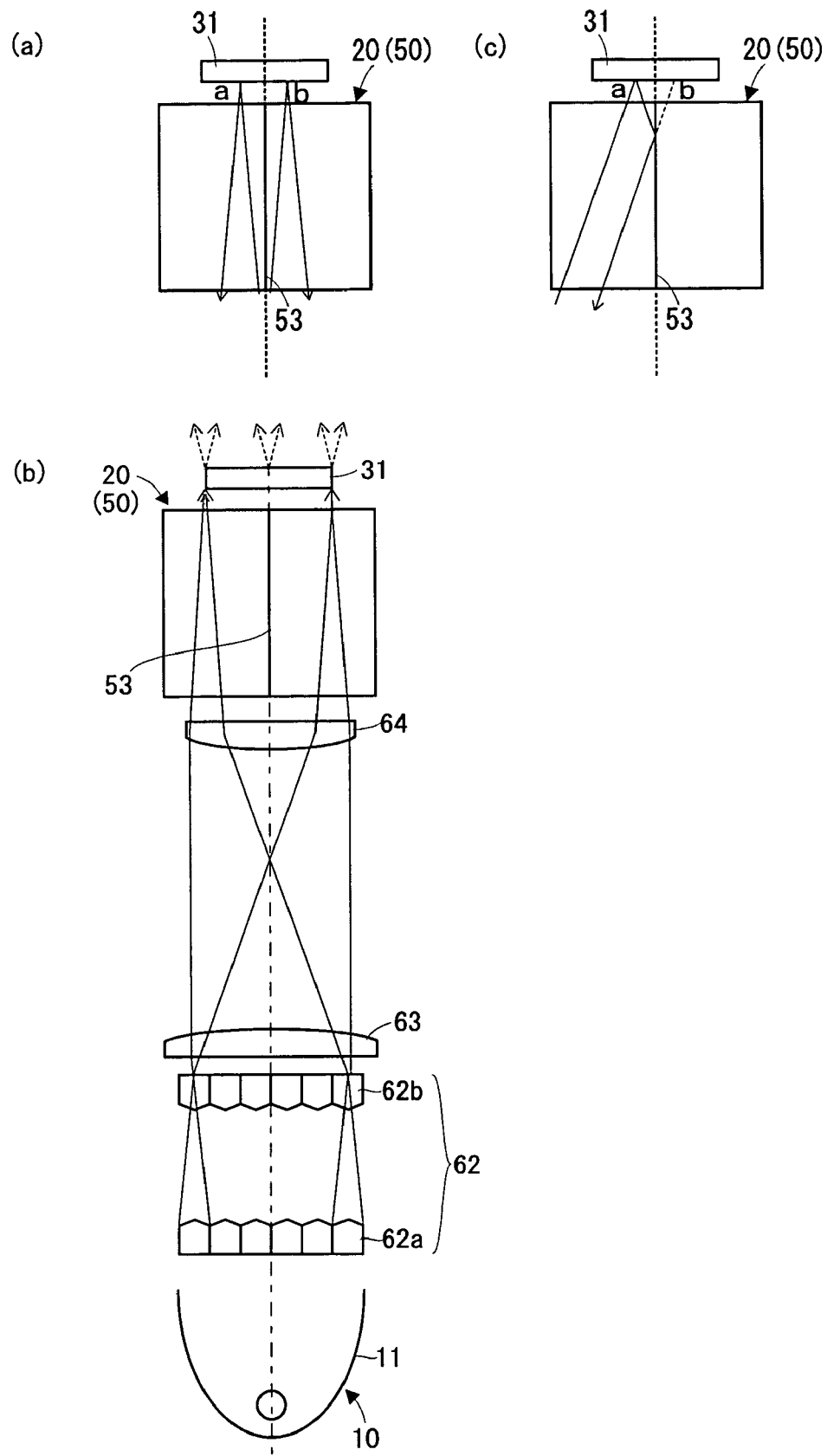
FIGS. 6a, 6b and 6c are plan views showing the outline of an optical system for a conventional reflection type liquid crystal projector.
Figure 7:
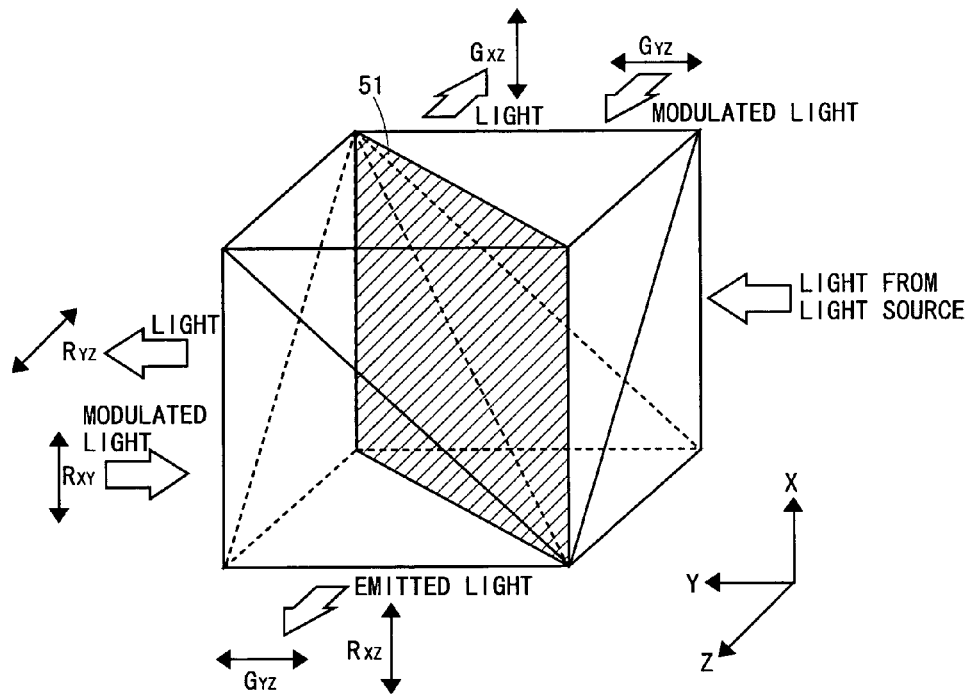
FIG. 7 is a diagram showing a background and an explanatory view showing the relationship between an optical surface in a color separating and mixing sector and incident/emitted light.
Figure 8:
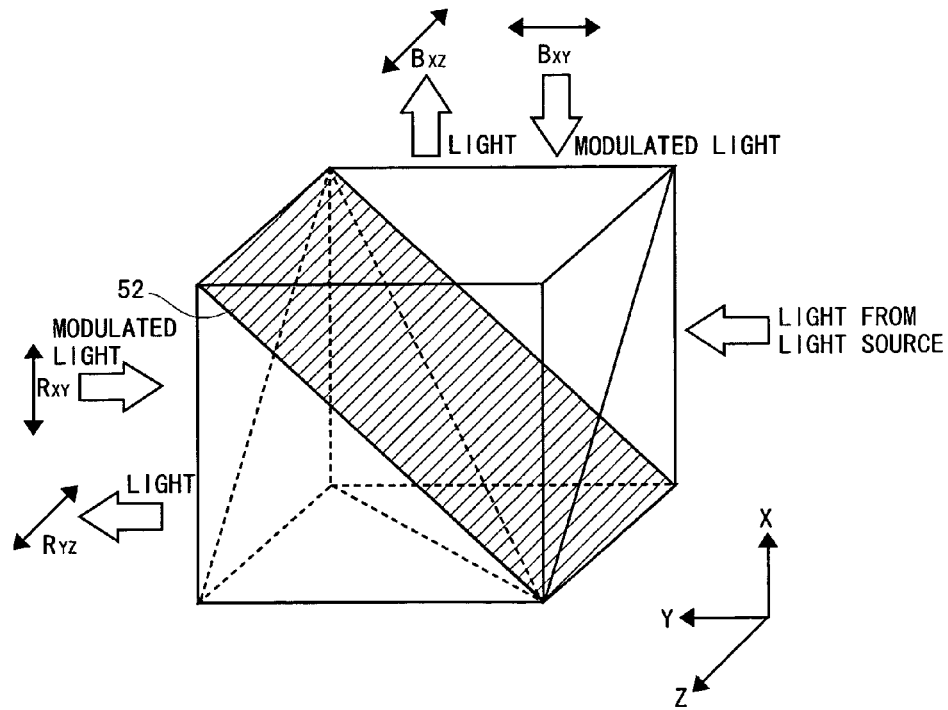
FIG. 8 is a diagram showing a background and an explanatory view showing the relationship between an optical surface in a color separating and mixing sector and incident/emitted light.
Figure 9:
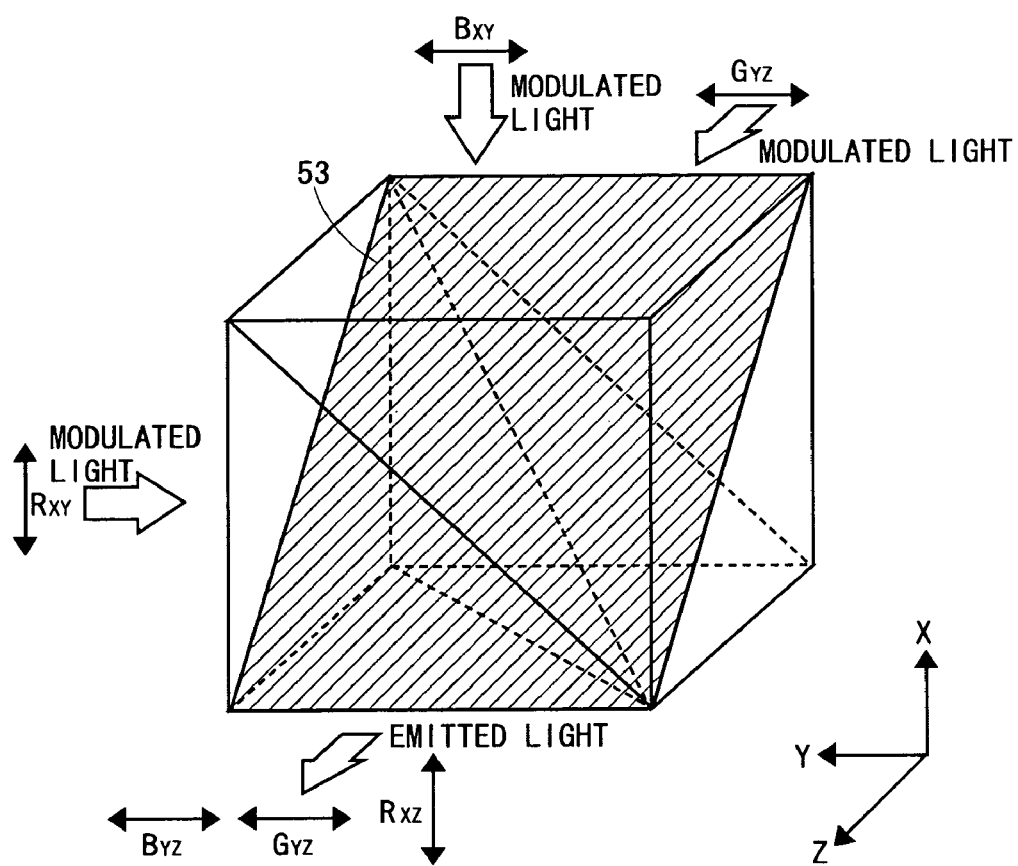
FIG. 9 is a diagram showing a background and an explanatory view showing the relationship between an optical surface in a color separating and mixing sector and incident/emitted light.

A reflection type liquid crystal projector according to a first embodiment of the present invention will be described on the basis of FIGS. 1, 2, and 5. The reflection type liquid crystal projector according to the present embodiment has an optical member and an arrangement form shown in FIG. 5. That is, a color separating and mixing element 20 comprises a light incidence surface opposed to a light source 10, three light emission/incidence surfaces respectively opposed to reflection type liquid crystal display panels 31, 32, and 33, a light emission surface opposed to a projection optical system 40, and another surface. The color separating and mixing element 20 comprises in its inner part a color separating and mixing sector 50 for separating light incident from the light source 10 into color lights in the three primary colors and emitting the color lights from the predetermined light emission/incidence surfaces. The emitted color lights in the three primary colors are respectively reflected by the reflection type liquid crystal display panels 31, 32, and 33 arranged opposite to the light emission/incidence surfaces. Each of the reflected color lights in the three primary colors is returned to the color separating and mixing element 20 after the direction of polarization thereof is rotated by 90°. The color separating and mixing sector 50 further mixes the color lights in the three primary colors which have been returned to the color separating and mixing element 20. Light obtained by the mixing (color video light:color image) is given to the projection optical system 40 from the light emission surface. The details of each of optical elements is as disclosed in JP-A-2002-162520. Although the following occurs in each of the color lights in the three primary colors, the liquid crystal display panel for red color 31 will be described by way of example.

Figure 1:
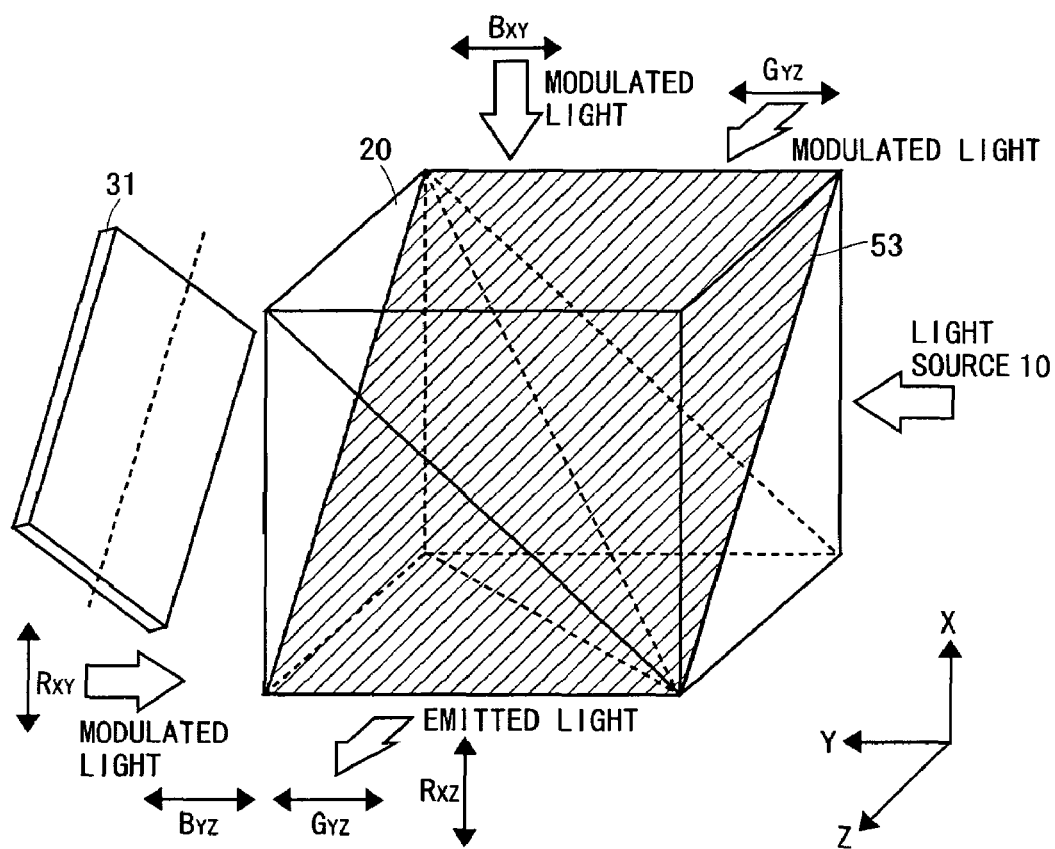
FIG. 1 is a perspective view showing the relationship between an optical surface in a color separating and mixing sector and a liquid crystal display panel for red color in a reflection type liquid crystal projector according to an embodiment of the present invention.

FIG. 1 is a perspective view showing the relationship between an optical surface 53 in the color separating and mixing sector 50 and the liquid crystal display panel for red color 31. A center line (indicated by a dotted line) of the liquid crystal display panel 31 is made parallel to the optical surface 53. The liquid crystal display panel 31 is divided into areas using as a boundary a horizontal center line (which can be also a vertical center line) thereof. One of the areas is taken as a first irradiation area, and the other area is taken as a second irradiation area. Letting A:B be the aspect ratio of the liquid crystal display panel 31, each of the first irradiation area and the second irradiation area is divided at a ratio A:B/2. A first light flux from the light source 10 is introduced into the first irradiation area, and a second light flux from the light source 10 is introduced into the second irradiation area.

Figure 2:
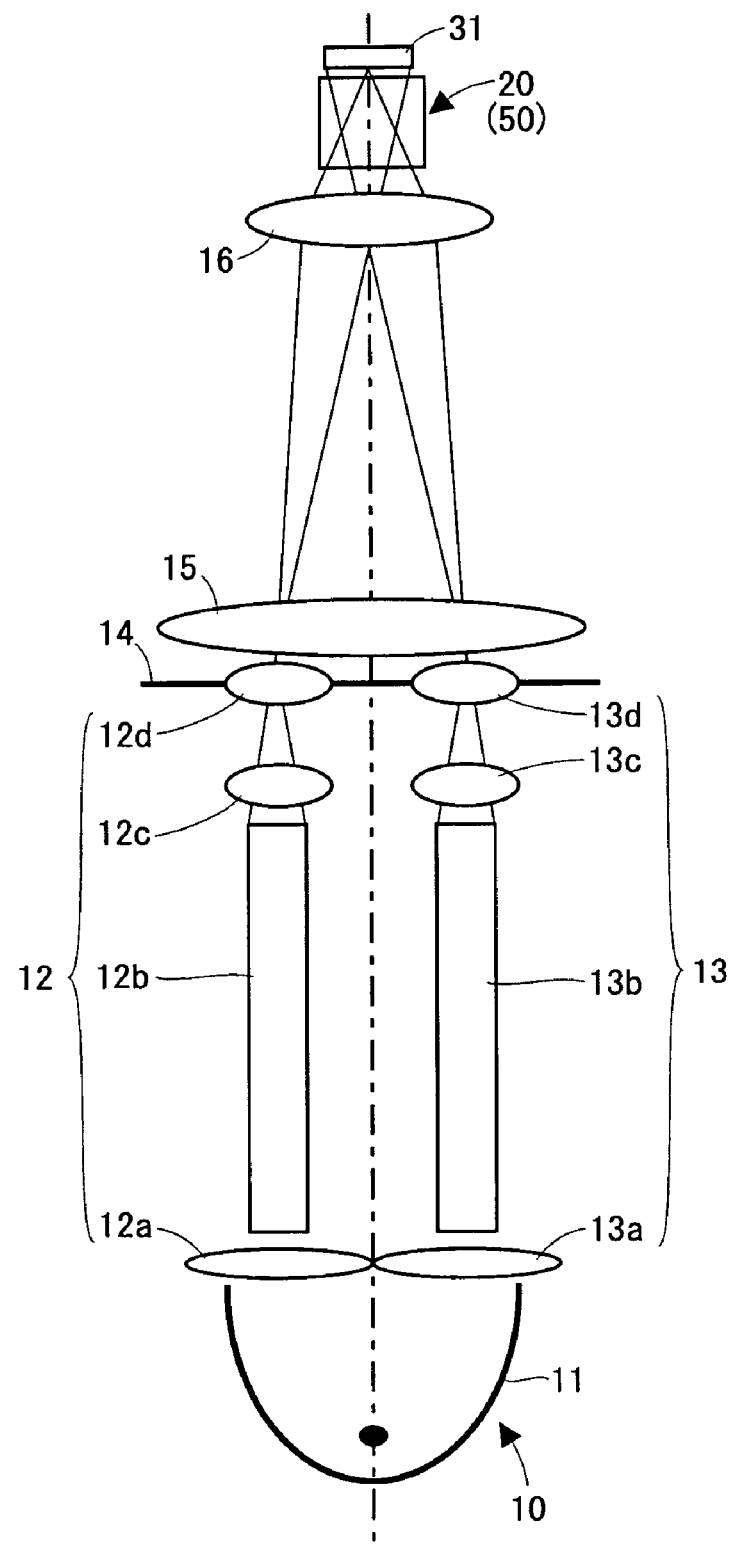
FIG. 2 is a plan view showing the outline of an optical system for a reflection type liquid crystal projector according to a first embodiment of the present invention.

FIG. 2 is an explanatory view showing the outline of an optical system for the reflection type liquid crystal projector according to the present embodiment, which simply illustrates the relationship among the light source 10, the color separating and mixing sector 50, and the reflection type liquid crystal display panel 31 (a phase plate or the like is also omitted)

On the light emission side of a lamp 11 (a ultra-high pressure mercury lamp, a metal halide lamp, a xenon lamp, etc.), a first light flux producer 12 for producing a first light flux and a second light flux producer 13 for producing a second light flux are arranged. The first light flux producer 12 comprises a condenser lens 12a, a rod integrator 12b, and a pair of lenses 12c and 12d. On the other hand, the second light flux producer 13 comprises a condenser lens 13a, a rod integrator 13b, and a pair of lenses 13c and 13d. Since the first light flux producer 12 and the second light flux producer 13 have the same configuration, the first light flux producer 12 will be mainly described.

The condenser lens 12a is arranged by occupying the half of a light emission area of the lamp 11, and is obtained by cutting a circular lens larger than the half of the area in conformity with the half of the area. The center of an optical axis of the condenser lens 12a is at a position intermediate between the center of the optical axis of the lamp 11 and an edge of the lamp 11. Light condensed by the condenser lens 12a is incident on a light incidence end surface of the rod integrator 12b. Light incident on the rod integrator 12b is repeatedly reflected inside the rod integrator 12b, and is emitted from a light emission end surface of the rod integrator 12b. The shapes of the end surfaces on the side of emission of the rod integrators 12b and 13b are similar to the shapes of the first and second irradiation areas.

The pair of lenses 12c and 12d corresponds to a set of pairs of lenses in a pair of fly's eye lenses. Light passing through the incidence-side lens 12c is focused in the vicinity of the emission-side lens 12d, and light emitted from the emission-side lens 12d is refracted by condenser lenses 15 and 16, and is introduced into a first area of the liquid crystal display panel 31 in such a manner as to cross the optical surface 53 in the color separating and mixing sector 50. Similarly, the pair of lenses 13c and 13d corresponds to a set of pairs of lenses in a pair of fly's eye lenses. Light passing through the incidence-side lens 13c is focused in the vicinity of the emission-side lens 13d, and light emitted from the emission-side lens 13d is refracted by the condenser lenses 15 and 16, and is introduced into a second area of the liquid crystal display panel 31 in such a manner as to cross the optical surface 53 in the color separating and mixing sector 50. The condenser lens 16 exists as an individual (a simple substance) at a position on the light incidence side of the color separating and mixing element 20, and receives two light fluxes which arrive in a crossing shape to refract the light fluxes.

The emission-side lens 12d in the pair of lenses 12c and 12d and the emission-side lens 13d in the pair of lenses 13c and 13d are respectively mounted on openings formed in a shading plate 14, and prevent lights other than lights passing through the lenses from being introduced into the liquid crystal display panel 31.

Figure 10:
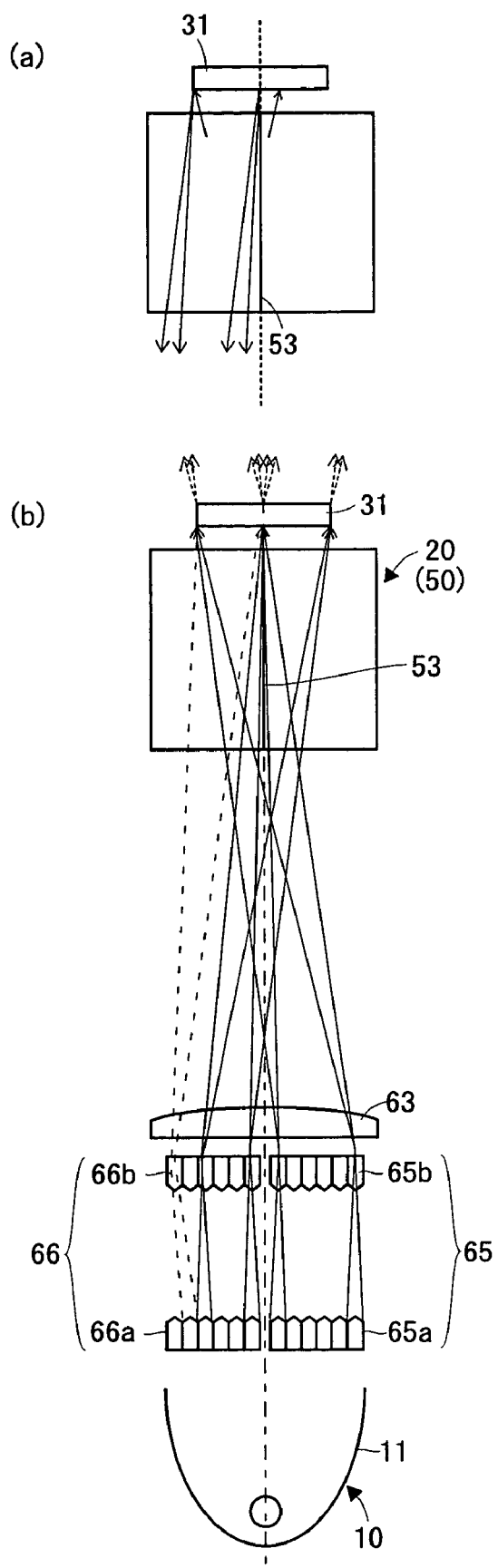
FIGS. 10a and 10b are plan views showing the outline of an optical system for a reflection type liquid crystal projector previously proposed by the applicant of the present invention (a configuration shown in FIG. 10 is not laid open at the time point of Japanese Patent Application that is based on of this patent application).

The light from the lamp 11 is thus completely separated into independent two light fluxes, respectively, by the first light flux producer 12 and the second light flux producer 13. The two light fluxes cross each other on the optical surface 53 in the color separating and mixing sector 50, and are respectively introduced into the first irradiation area and the second irradiation area of the liquid crystal display panel 31. That is, reflected light modulated by the reflection type liquid crystal display panel 31 is reflected in a direction away from the optical surface 53 in the color separating and mixing sector 50, not to cross the optical surface 53 in the color separating and mixing sector 50. Accordingly, a double image is prevented from being formed by total reflection and transmission on the optical surface 53 in the color separating and mixing sector 50. Further, light is not changed into two light fluxes using a pair of integrator lenses each composed of a lot of pairs of convex lenses, as shown in FIG. 10, and the two light fluxes are completely separated by the two rod integrators, thereby reliably preventing the double image.

Embodiment 2

Figure 3:
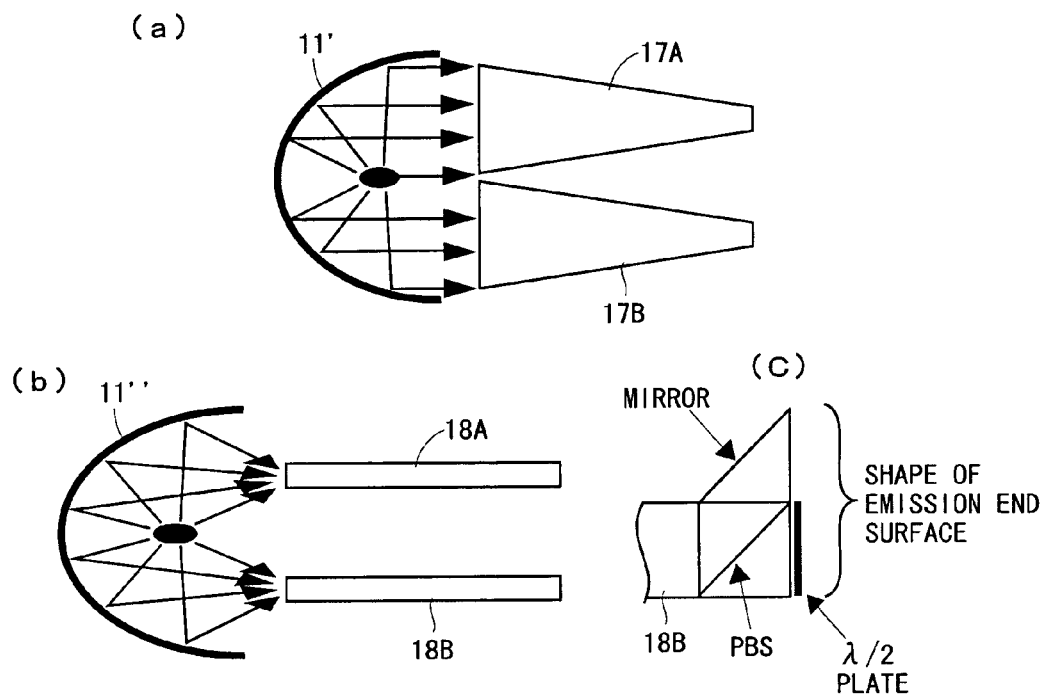
FIGS. 3a and 3b are explanatory views showing a reflection type liquid crystal projector according to a second embodiment of the present invention.

A second embodiment of the present invention will be described on the basis of FIG. 3.

In a projection type video display shown in FIG. 3(a), a lamp 11' comprises a parabolic reflector, and emits approximately parallel lights. The shape of an opening on the light emission side of the lamp 11' is set to an approximately square shape (similar to the aspect ratio of a liquid crystal display panel 31) the half thereof (corresponding to first and second irradiation areas of the liquid crystal display panel 31) being occupied to position a light incidence end surface of a first rod integrator 17A, and the other half thereof being occupied to position a light incidence end surface of a second rod integrator 17B. The sizes of light emission end surfaces of the first and second rod integrators 17A and 17B and the positional relationship therebetween are the same as the sizes of the light emission end surfaces of the rod integrators 12b and 13b and the positional relationship therebetween shown in FIG. 2. Further, the same configuration as that shown in FIG. 2 is applicable to an optical system in a stage succeeding the light emission end surfaces of the first and second rod integrators 17A and 17B.

In the configuration shown in FIG. 3(a), the necessity of the condenser lenses 12a and 13a shown in FIG. 2 can be eliminated, thereby reducing the number of parts in an optical system.

In a projection type video display shown in FIG. 3(b), a lamp 11" comprises a two-focuses elliptic reflector. The two-focuses elliptic reflector is so configured that two light converging points can be formed with respect to one light emitting point, and has a first elliptic reflector area where a first light converging point is formed from one light emitting point and a second elliptic reflector area where a second light converging point is formed from the one light emitting point. A light incidence end surface of a first rod integrator 18A is positioned at the first light converging point, and a light incidence end surface of a second rod integrator 18B is positioned at the second light converging point. The arrangement relationship between the first and second rod integrators 17A and 17B is the same as the arrangement relationship between the rod integrators 12b and 13b shown in FIG. 2. Further, the same configuration as that shown in FIG. 2 is applicable to an optical system in a stage succeeding light emission end surfaces of the first and second rod integrators 18A and 18B.

In the configuration shown in FIG. 3(b), the necessity of the condenser lenses 12a and 13a shown in FIG. 2 can be eliminated, thereby reducing the number of parts in an optical system. Although the cone angle of light fluxes which have been emitted from each of the rod integrators 17A and 17B is increased because its light emission end surface is smaller than its light incidence end surface in the configuration shown in FIG. 3(a), the sizes of the light incidence end surface and the light emission end surface of the rod integrator are made the same, thereby making it possible to prevent the cone angle from being enlarged in the configuration shown in FIG. 3(b).

A reflector may be provided in an area other than the positions of two light converging points in the lamp 11", to return unnecessary light toward the lamp 11" to achieve effective utilization of light. Further, predetermined polarized light is introduced into the color separating and mixing element 20. A polarization conversion system used therefor may be provided on the light emission end surface of the rod integrator, as shown in FIG. 3(c), rather than being provided on the light incidence side of the rod integrator. Of course, the polarization conversion system may be arranged at any position, provided that it is a position in a stage succeeding the light emission end surface of the rod integrator and short of the light incidence side of the color separating and mixing element 20. The polarization conversion system shown in FIG. 3(c) is composed of a polarizing beam splitter (hereinafter referred to as PBS). The PBS comprises a polarized light separating surface and a phase plate (½ λ plate). The polarized light separating surface in the PBS passes P-polarized light and changes the optical path of S-polarized light by 90°, for example, in the incident light. The S-polarized light whose optical path has been changed is reflected by an adjacent total reflection mirror (which may be a prism) and is emitted. On the other hand, the P-polarized light which has passed through the polarized light separating surface is converted into S-polarized light by the phase plate (½ λ plate) provided on the front side (on the light exit side) and is emitted. That is, in this example, almost all lights are converted into S-polarized lights.

Embodiment 3

A third embodiment of the present invention will be described on the basis of FIGS. 4(a) and 4(b).

In a projection type video display shown in FIG. 4(a), first and second rod integrators 17A and 17B are arranged such that their optical axes (center lines) cross each other. The crossing arrangement of the optical axes makes it possible to eliminate the necessary of the condenser lens 15 for crossing and refraction shown in FIG. 2. Light sources 19A and 19B each composed by arranging solid-state light emitting elements (e.g., LEDs (light emitting diodes)) in an array shape are respectively provided on light incidence end surfaces of the rod integrators 17A and 17B. Although the intensity distribution of lights from the light sources 19A and 19B is non-uniform due to the array-shaped arrangement, the lights are superimposed (integrated) by passing through the rod integrators 17A and 17B, and the lights whose intensity distribution is made uniform are respectively emitted from light emission end surfaces of the rod integrators 17A and 17B.

Figure 4:
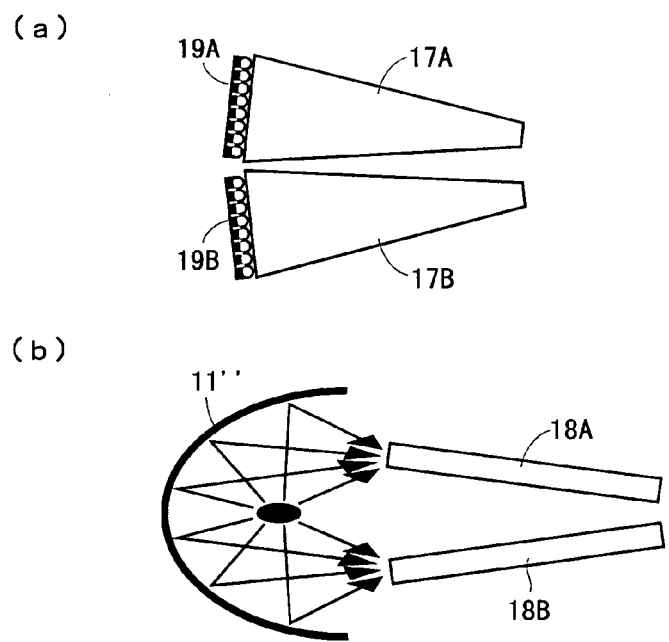
FIGS. 4a and 4b are plan views showing the outline of an optical system for a reflection type liquid crystal projector according to a third embodiment of the present invention.

In a projection type video display shown in FIG. 4(*b*), a light incidence end surface of a first rod integrator 18A is positioned at a first light converging point of a lamp 11", and a light incidence end surface of a second rod integrator 18B is positioned at a second light converging point. The first and second rod integrators 18A and 18B are arranged such that their optical axes (center lines) cross each other. The crossing arrangement of the optical axes makes it possible to eliminate the necessary of the condenser lens 15 for crossing and refraction shown in FIG. 2.

In a configuration other than the configuration shown in FIG. 4(*a*), a solid-state light source (an LED (Light Emitting Diode), a semiconductor laser, etc.) may be also used. Further, a lamp (a light source), described above, a color separating and mixing element, an optical element (a rod integrator, etc.) leading to the color separating and mixing element from the lamp (light source) may be unitized.

As described in the foregoing, in a configuration comprising a color separating and mixing element, having a color separating and mixing sector having a plurality of different surfaces arranged in its transparent cube, for causing predetermined polarized light from a light source to be incident on a first face of the cube, giving lights to reflection type light modulating elements respectively arranged opposite to second, third, and fourth faces of the cube as well as causing their reflected modulated lights to be incident thereon, and mixing the incident reflected modulated lights and emitting light obtained by the mixing from a fifth face of the cube, the projection type video display according to the present invention prevents the reflected modulated light from being totally reflected by the color separating and mixing sector, thereby making it possible to prevent a double image from being produced. Since the above-mentioned two light fluxes are completely separated by two rod integrators and are given in an independent form, thereby reliably preventing the double image from being formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video light producing device comprising a color separating and mixing element, having a color separating and mixing sector having a plurality of different optical surfaces arranged in a transparent cube, for receiving predetermined polarized light from a light source on a first face of the cube, giving lights to reflection type light modulating elements respectively arranged opposite to second, third, and fourth faces of the cube as well as receiving their reflected modulated lights thereon, and mixing the incident reflected modulated lights and emitting light obtained by the mixing from a fifth face of the cube, wherein
   the light from the light source is changed into two light fluxes by two rod integrators, and
   the two light fluxes cross each other on one of the plurality of different optical surfaces of the color separating and mixing sector, to be introduced into a first irradiation area and a second irradiation area of one of the reflection type light modulating elements.

2. The video light producing device according to claim 1, wherein
   there is provided a light source comprising a reflector in the shape of a curved surface, and
   approximately parallel lights from said light source are condensed, and are introduced into light incidence surfaces of said two rod integrators.

3. The video light producing device according to claim 1, wherein
   there is provided a light source comprising a reflector for forming two light converging points from one light emitting point, and
   light incidence surfaces of said two rod integrators are respectively arranged in the vicinity of the positions of the two light converging points of said light source.

4. The video light producing device according to claim 1, wherein
   there are provided two light sources, and
   lights from the light sources are respectively introduced into light incidence surfaces of said two rod integrators.

5. The video light producing device according to claim 1, wherein
   each of the light sources is composed of a solid-state light source.

6. The video light producing device according to claim 1, wherein
   an single optical element is provided at a position on the light incidence side of said color separating and mixing element, and
   the two light fluxes which arrive in a crossing state is refracted by said optical element.

7. The video light producing device according to claim 1, wherein
   an optical system arranged on the light emission side in said two rod integrators comprises at least a first optical element for condensing light emitted from each of the rod integrators and a second optical element arranged in the vicinity of light converging point of the first optical element.

8. The video light producing device according to claim 7, wherein
   said two rod integrators are arranged parallel to each other, and
   said optical system comprises a third optical element for refracting lights passing through said second optical element and crossing the refracted lights each other.

9. The video light producing device according to claim 7, wherein
   said two rod integrators are arranged unparallel to each other, and
   lights passing through said second optical element cross each other.

10. The video light producing device according to claim 1, wherein
    letting A:B be an aspect ratio in the reflection type light modulating element, each of the first irradiation area and the second irradiation area is divided at a ratio of A:B/2.

11. The video light producing device according to claim 1, wherein
    the light source, the color separating and mixing element, and an optical element leading to the color separating and mixing element from the light source are unitized.

12. A projection type video display comprising the video light producing device according to any one of claims 1 to 11.

* * * * *